United States Patent
Cho et al.

(10) Patent No.: US 10,780,429 B2
(45) Date of Patent: Sep. 22, 2020

(54) METHOD FOR SYNTHESIZING ZEOLITE USING STRUCTURE DIRECTING AGENT CONTAINING BENZYL GROUP AND ZEOLITE SYNTHESIZED THEREFROM

(71) Applicants: INDUSTRY FOUNDATION OF CHONNAM NATIONAL UNIVERSITY, Gwangju (KR); KOREA UNIVERSITY RESEARCH AND BUSINESS FOUNDATION, Seoul (KR)

(72) Inventors: Sung June Cho, Gwangju (KR); Kwan Young Lee, Seoul (KR); Soon Hee Park, Gwangju (KR); Seung Gwan Lee, Jeollanam-do (KR)

(73) Assignees: INDUSTRY FOUNDATION OF CHONNAM NATIONAL UNIVERSITY (KR); KOREA UNIVERSITY RESEARCH AND BUSINESS FOUNDATION (KR)

( * ) Notice: Subject to any disclaimer, the term of this patent is extended or adjusted under 35 U.S.C. 154(b) by 0 days.

(21) Appl. No.: 16/469,125

(22) PCT Filed: Nov. 27, 2017

(86) PCT No.: PCT/KR2017/013620
§ 371 (c)(1),
(2) Date: Jun. 12, 2019

(87) PCT Pub. No.: WO2018/110860
PCT Pub. Date: Jun. 21, 2018

(65) Prior Publication Data
US 2019/0330071 A1     Oct. 31, 2019

(30) Foreign Application Priority Data
Dec. 12, 2016 (KR) .......... 10-2016-0168865

(51) Int. Cl.
*C01B 39/48* (2006.01)
*B01J 29/70* (2006.01)
(Continued)

(52) U.S. Cl.
CPC ....... *B01J 29/7007* (2013.01); *B01J 29/7015* (2013.01); *B01J 29/7615* (2013.01);
(Continued)

(58) Field of Classification Search
CPC ........ C01B 39/48; C01B 39/026; B01J 29/70; B01J 29/7015; B01J 29/7007;
(Continued)

(56) References Cited

U.S. PATENT DOCUMENTS 4,481,173 A * 11/1984 Chu .................. B01J 29/40
                                                    423/326
4,544,538 A * 10/1985 Zones .................. B01J 29/70
                                                    423/706
(Continued)

FOREIGN PATENT DOCUMENTS

KR    20090123978 A    12/2009

OTHER PUBLICATIONS

Xiong et al.,"Efficient and rapid transformation of high silica CHA zeolite from FAU zeolite in the absence of water", J. Mater. Chem. A 2017, 5, 9076-9080 (Year: 2017).*
(Continued)

*Primary Examiner* — David M Brunsman
(74) *Attorney, Agent, or Firm* — Renaissance IP Law Group LLP

(57) ABSTRACT

Disclosed are method for synthesizing zeolites by using structure directing agent having benzyl groups and zeolites synthesized therefrom. A zeolite having various effects can be produced by using a material including a structure directing agent containing various benzyl groups, and raw
(Continued)

```
PREPARING HYDROGEL COMPRISING RAW MATERIAL
HAVING ALUMINUM OXIDE AND SILICA, THE FIRST          S100
SDA CONTAINING BENZYL GROUP,
BASIC MATERIAL AND DISTILLED WATER

↓

COLLECTING SAMPLE AFTER THE HYDROGEL IS              S200
HYDROTHRMALLY SYNTHESIZED
``` material with various $SiO_2/Al_2O_3$ molar ratios as alumina and silica source.

5 Claims, 7 Drawing Sheets

(51) Int. Cl.
 *B01J 29/76* (2006.01)
 *F01N 3/20* (2006.01)
 *C01B 39/02* (2006.01)

(52) U.S. Cl.
 CPC ............ *C01B 39/026* (2013.01); *C01B 39/48* (2013.01); *F01N 3/2066* (2013.01); *C01P 2002/72* (2013.01); *C01P 2004/62* (2013.01); *C01P 2006/12* (2013.01)

(58) Field of Classification Search
 CPC .............. C01P 2004/62; C01P 2006/12; C01P 2006/13; C01P 2006/37
 See application file for complete search history.

(56) References Cited

U.S. PATENT DOCUMENTS

| | | | | |
|---|---|---|---|---|
| 5,225,179 | A * | 7/1993 | Zones | ............... C01B 37/02 423/709 |
| 7,597,874 | B1 * | 10/2009 | Miller | ............... C01B 39/48 423/700 |
| 8,007,763 | B2 * | 8/2011 | Zones | ............... B01J 29/70 423/703 |
| 2008/0159951 | A1 * | 7/2008 | Miller | ............... C01B 37/02 423/704 |
| 2011/0165051 | A1 * | 7/2011 | Beutel | ............... B01D 53/9418 423/239.2 |

OTHER PUBLICATIONS

Fickel et al, "Copper coordination in Cu-SSZ-13 and Cu-SSZ-16 investigated by Variable-Temperature XRD", J. Phys. Chem. C, 2010, 114, 1633-1640 (Year: 2010).*

Yamanaka et al, "Acid stability evaluation of CHA-type zeolites synthesized by interzeolite conversion of FAU-type zeolite and their membrane application for dehydration of acetic acid aqueous solution", Micorporous and Mesoporous Materials, 158, 1, 2012, 141-147 (Year: 2012).*

Itakura et al, "Synthesis of high-silica CHA type zeolite by interzeolite conversion of FAU type zeolite in the presence of seed crystals", Micorporous and Mesoporous Materials, 144, 1-3, 2011, 91-96 (Year: 2011).*

Inoue, Takayuki et ai., "Synthesis of LEV Zeolite by Interzeolite Conversion Method and its Catalytic Performance in Ethanol to Olefins Reaction", Microporous and Mesoporous Materials, 2009, vol. 122, Nos. 1-3, pp. 149-154.

Takura, Masaya et al., "Synthesis of High-silica CHA Zeolite from FAU Zeolite in the Presence of Benzyltrimethylammonium Hydroxide", Chemistry Letters, 2008, vol. 37, No. 9, pp. 908-909.

Martin, Nuria et al., "High Yield Synthesis of High-silica Chabazite by Combining the Role of Zeolite Precursors and Tetraethylammonium: SCR of NOx", Chemical Communications, 2015, vol. 51, No. 49, pp. 9965-9968.

Yamanaka, Naoki et al., "Effect of Structure-Directing Agents on FAU-CHA Interzeolite Conversion and Preparation of High Pervaporation Performance CHA Zeolite Membranes for the Dehydration of Acetic Acid Solution", Bulletin of the Chemical Society of Japan, 2013, vol. 86, No. 11, pp. 1333-1340.

* cited by examiner

XRD PATTERN $^{29}$Si NMR SPECTRA

COMPARATIVE EXAMPLE

PRODUCTION EXAMPLE 1

PRODUCTION EXAMPLE 4

Cu-LOADED ZEOLITE OF COMPARATIVE EXAMPLE

Cu-LOADED ZEOLITE OF PRODUCTION EXAMPLE 1

Cu-LOADED ZEOLITE OF
COMPARATIVE EXAMPLE
AFTER HYDROTHERMAL
TREATMENT AT 900°C

Cu-LOADED ZEOLITE OF
PRODUCTION EXAMPLE 1
AFTER HYDROTHERMAL
TREATMENT AT 900°C

Cu-LOADED ZEOLITE OF
COMPARATIVE EXAMPLE

Cu-LOADED ZEOLITE OF
PRODUCTION EXAMPLE 1

METHOD FOR SYNTHESIZING ZEOLITE USING STRUCTURE DIRECTING AGENT CONTAINING BENZYL GROUP AND ZEOLITE SYNTHESIZED THEREFROM

TECHNICAL FIELD

The present disclosure is related to method of synthesizing zeolite using structure directing agent containing a benzyl group and a zeolite synthesized therefrom, more particularly zeolite synthesized by using structure directing agent containing a benzyl group, which can obtain effects such as reduction of raw material cost and reduction of processing cost by using a structure directing agent containing a benzyl group.

BACKGROUND

Zeolite is a three-dimensional aluminosilicate mineral with regularly distributed pores capable of molecular access, and was first discovered by the Swedish mineralogist Crönsted. When he heated the natural zeolite ore, he observed the boiling phenomenon by bubbling and named it "zeolite" which means "boiling stone".

The zeolite is usually filled with water molecules in the nanosized pores. The zeolite desorbs the water molecules from the pores without causing any substantial change in the structure of the zeolite by heating or decompression, and absorbs again water molecules when the zeolite is left in the air. Because of specific characteristics, the zeolite has become the subject of research by mineralogists and chemists.

The general structure of zeolite is that tetrahedral units consisting of $SiO_4^{4-}$ and $AlO_4^{5-}$ are connected through oxygen cross-linking. In this structure, Si has a +4 formal charge, but Al has only +3 formal charge, so it accommodates one negative charge everywhere there is Al. Therefore, there are cations for charge compensation, the cations are inside the pores, and the remaining spaces are usually filled with water molecules.

Zeolite has adsorbability and ion exchange ability due to its unique crystal structure, and has industrially useful physicochemical properties. The zeolite has the best cation exchange capacity among minerals and exhibits selective cation exchange characteristics depending on the type of zeolite. Since the Si constituting the zeolite structure has +4 formal charge and Al has +3 formal charge, cation is needed to neutralize the charge difference caused by Al. Because cations are not fixed at specific sites and charged near negative charge in the zeolite structure, the cations may be exchanged with other cations. For example, when a zeolite having $A^+$ cation is putted into an aqueous solution having $B^+$ cation, the $A^+$ cation is introduced into the aqueous solution and $B^+$ cation enters the zeolite. As described above, the phenomenon that the cations contained in the zeolite and the cations contained in the solution are mutually exchanged is referred to as a cation exchange. The cation exchange of the zeolite is influenced by the kind of cations, size and charge quantity of cations, temperature of the cation exchange, kind of anion affection the cation in the solution, and the structural characteristics of the zeolite.

Recently, zeolite impregnated with Cu has attracted attention as a catalyst for selective reduction of nitrogen oxides in exhaust gas of automobiles. However, in order to be industrially used, it is necessary to have sufficient ion exchange capacity or solid acidity, and to have durability as an adsorbent or a catalyst carrier.

For example, when the conventional zeolite is used as adsorbent or a catalyst support, durability and thermal resistance are lowered, and the zeolite structure is destroyed during hydrothermal treatment.

Accordingly, there is a need for a novel zeolite synthesizing method and a zeolite produced therefrom that overcomes the problem of destroying the zeolite structure in the hydrothermal treatment process.

DISCLOSURE

Technical Problem

The aspect of the present inventive concept is to provide a method for synthesizing zeolite by using a structure directing agent containing a benzyl group.

The another aspect of the present inventive concept is to provide a zeolite synthesized by using the structure directing agent containing the benzyl group.

Technical Solution

One aspect of the present inventive concept provides a method for synthesizing zeolite by using a structure directing agent containing a benzyl group. The method comprises preparing a hydrogel having a first structure directing agent containing a benzyl group, a zeolite raw material, a basic material and distilled water, and hydrothermally synthesizing the hydrogel, wherein the zeolite raw material comprises alumina and silica source, and the first structure directing agent containing the benzyl group is selected from the group consisting of hydroxides, halides, carbonates and sulphates which have benzyltrimethylammonium ion, benzyltriethylammonium ion, benzyltripropylammonium ion or benzyltributylammonium ion as cations.

According one embodiment of the present inventive concept, the hydrogel may further comprise a second structure directing agent, wherein the second structure directing agent comprises at least one selected from the group consisting of hydroxides, halides, carbonates and sulphates including a cation having the following formula,

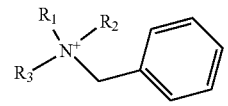

wherein $R_1$ is one selected from the group consisting of alkyl of $C_1$ to $C_4$, $R_2$ is one selected from the group consisting of alkyl of $C_1$ to $C_4$, and $R_3$ is one selected from the group consisting of alkyl of $C_8$ to $C_{20}$.

The zeolite synthesized by using the hydrogel containing the second structure directing agent has an average particle size of 0.2 μm to 1.0 μm.

According to one embodiment, the zeolite raw material may have a $SiO_2/Al_2O_3$ molar ratio of 5 to 600 and the synthesized zeolite may be in the type of SSZ-13 (Standard Oil Synthetic Zeolite-13).

According to one embodiment, the synthesized zeolite may be the type of BEA (Zeolite Beta) using the zeolite raw material with a $SiO_2/Al_2O_3$ molar ratio of 490 to 510.

According to one embodiment, the hydrogel may further comprise compound including sulfate ion.

Another aspect of the present inventive concept provides a zeolite with Si/Al molar ratio of 10 to 100, wherein a structure of the zeolite is retained even after hydrothermal treatment in a temperature range of 750° C. to 950° C.

The structure of the zeolite is retained even after hydrothermal treatment in a temperature range of 850° C. to 950° C.

The zeolite may have a specific surface area of 500 m²/g to 600 m²/g.

The structure of the zeolite may comprise 0 to 4 Al atoms per unit cell and have Cu/Al molar ratio of 0.2 to 0.4.

The zeolite may have NOx conversion of 50% to 80% in the selective catalytic reduction using $NH_3$ in a temperature range of 250° C. to 500° C. after hydrothermal treatment at 900° C.

Advantageous Effects

According to the present inventive concept, effects such as reduction of raw material cost and reduction of processing cost can be obtained by using the structure directing agent containing a benzyl group.

Furthermore, because the first structure directing agent and the second structure directing agent are used, zeolite having excellent hydrothermal stability can be synthesized, so that zeolite structure can be retained even after hydrothermal treatment at a high temperature and selective catalytic reduction activity can be enhanced.

Furthermore, by additionally using a structure directing agent containing a benzyl group having an alkyl group of $C_8$ to $C_{20}$, it is possible to synthesize a zeolite having micropores and mesopores at the same time, thereby can facilitate diffusion of the reactant such that the zeolite may be applied to various catalysis reaction.

Further, by adding sulfate ions to the zeolite synthetic mixture, the hydrothermal reaction rate becomes faster, the zeolite synthesis time is shortened, and the effect of shortening the process time can be obtained.

In addition, a zeolite having a desired structure can be produced according to the $SiO_2/Al_2O_3$ molar ratio of the raw material as alumina and silica source.

Furthermore, it is possible to synthesize a zeolite having a desired structure by changing the $SiO_2/Al_2O_3$ molar ratio of the raw material as alumina and silica source.

Effects of the present inventive concept are not limited to the above-described effects and other unmentioned effects may be clearly understood by those skilled in the art from the following descriptions.

MODES OF THE INVENTION

Figure 1:
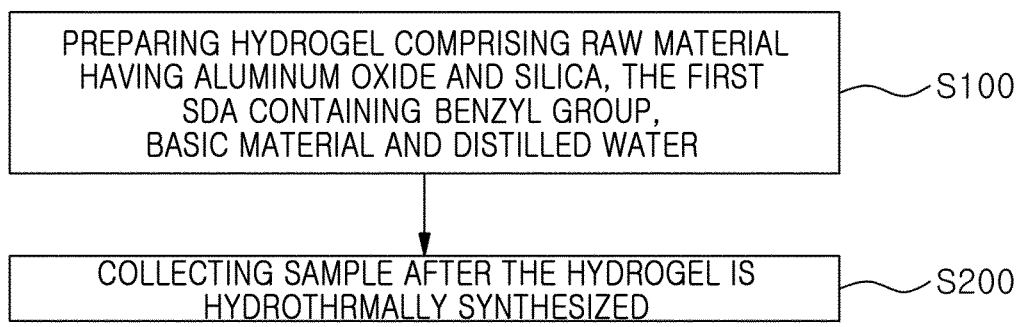
FIG. 1 is flow chart illustrating a method for synthesizing zeolite by using a structure directing agent containing a benzyl group according to an embodiment of the present inventive concept.

Hereinafter, embodiments of the present inventive concept will be described in detail with reference to the accompanying drawings.

While the present inventive concept is susceptible to various modifications and alternative forms, specific embodiments thereof are shown by way of example in the drawings and will herein be described in detail. However, it should be understood that there is no intent to limit the invention to the particular forms disclosed but rather the invention is to cover all modifications, equivalents, and alternatives falling within the spirit and scope of the invention defined by the appended claims.

When an element such as a layer, a region, and a substrate is referred to as being disposed "on" another element, it should be understood that the element may be directly formed on the other element or an intervening element may be interposed therebetween.

It should be understood that, although the terms "first," "second," etc. may be used herein to describe various elements, components, areas, layers, and/or regions, these elements, components, areas, layers, and/or regions are not limited by these terms.

Embodiment

FIG. 1 is flow chart illustrating a method for synthesizing zeolite by using a structure directing agent containing a benzyl group according to an embodiment of the present inventive concept.

Referring to FIG. 1, the method of synthesizing zeolite by using the structure directing agent containing a benzyl group according to the present inventive concept comprises two steps.

First, a hydrogel is prepared (S100).

Specifically, the hydrogel includes a raw material as alumina and silica source, a first structure directing agent (SDA) containing a benzyl group, a basic material and distilled water.

The zeolite raw material as alumina and silica source may be a raw material such as Y zeolite or ultra stable Y zeolite (USY zeolite) type.

According to the $SiO_2/Al_2O_3$ molar ratio of the zeolite raw material as alumina and silica source, the type of the zeolite using the structure directing agent containing the benzyl group prepared in the present inventive concept may be changed and a zeolite having a desired structure may be synthesized.

A first form of the zeolite using structure directing agent containing benzyl group is SSZ-13 (Standard Oil Synthetic Zeolite-13), and may be synthesized in case the $SiO_2/Al_2O_3$ molar ratio of the zeolite raw material is 5 to 600. In one embodiment, USY zeolite with a $SiO_2/Al_2O_3$ molar ratio of 30 is used in the present inventive concept.

When the $SiO_2/Al_2O_3$ molar ratio of the zeolite raw material is in the range of 5 to 80, zeolite having excellent hydrothermal stability, which is the object of the present inventive concept, can be obtained.

The second type of the zeolite using the structure directing agent containing the benzyl group is the type of BEA (Zeolite Beta), and may be synthesized in case the $SiO_2/Al_2O_3$ molar ratio of the zeolite raw material is in the range of 490 to 510, which is a specific range. In one embodiment, USY zeolite with a $SiO_2/Al_2O_3$ molar ratio of 500 is used in the present inventive concept.

The first structure directing agent (SDA) has at least one compound selected from the group consisting of hydroxide, halide, carbonate and sulphate which have benzyltrimethylammonium ion, benzyltriethylammonium ion, benzyltripropylammonium ion or benzyltributylammonium ion as cations.

For example, the first SDA has at least one selected from the group consisting of benzyltrimethylammonium hydroxide, benzyltriethylammonium hydroxide, benzyltripropylammonium hydroxide, benzyltributylammonium hydroxide, benzyltrimethylammonium halide, benzyltriethylammonium halide, benzyltripropylammonium halide, and benzyltributylammonium halide.

By using the SDA containing the above described benzyl group without using the conventional adamantane series as SDA, it is possible to obtain effects such as reduction of raw material cost and reduction of processing cost.

The basic substance is a material for making a basic aqueous solution by mixing with the distilled water, and any basic substance which does not cause compatibility problem with the hydrogel can be used. For example, NaOH can be used as basic substance.

The hydrogel may further comprise a second SDA to form the mesopores of the zeolite using the SDA containing the benzyl group of the present inventive concept.

Wherein the second SDA has at least one compound selected from the group consisting of hydroxides, halides, carbonates and sulfates having a cation of the chemical formula 1.

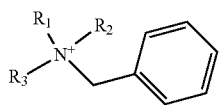

[chemical formula 1]

In the chemical formula 1, $R_1$ and $R_2$ may be at least any one of a methyl group, an ethyl group, a propyl group, and a butyl group, and $R_3$ may be one selected from the group consisting of alkyl groups having 8 to 20 carbon atoms. Preferably, benzyl dimethyl hexadecyl ammonium halide may be used as the second SDA.

As described above, according to further using the second SDA containing a benzyl group having an alkyl group of 8 to 20 carbon atoms, a zeolite simultaneously having both micropores and mesopores can be produced, thereby can facilitate diffusion of the reactant such that the zeolite may be used in various catalysis reaction.

After the hydrogel is prepared, hydrothermal synthesis of the hydrogel is performed (S200).

The hydrothermal synthesis is performed by using a conventional hydrothermal synthesis process, preferably hydrothermal synthesis at 140° C. for 4 days to 10 days under rotation of 20 rpm to 60 rpm.

On the other hand, if the hydrogel further contains a compound having sulfate ion in the step of preparing a hydrogel (S100), the hydrothermal reaction rate is increased and the zeolite synthesis time is shortened and the effect of shortening the process time can be obtained.

In one embodiment, $Na_2SO_4$ is used as the compound having the sulfate ion, thereby the hydrothermal synthesis process is shortened to 1 day to 4 days.

According to another embodiment of the present inventive concept, there is provided a zeolite using a SDA containing a benzyl group synthesized by the above described synthesizing method.

The zeolite using the SDA containing a benzyl group according to this embodiment has a Si/Al molar ratio of 10 to 100 and an aluminum content is low, which has excellent hydrothermal stability. Therefore, the zeolite does not undergo structural change even the hydrothermal process over 750° C.

The zeolite may have micropores and have an average particle size of 0.2 μm to 0.5 μm. When the second SDA is further used in the synthesis of the zeolite, a zeolite having an average particle size of 0.2 μm to 1.0 μm and simultaneously having micropores and mesopores can be obtained.

On the other hand, copper-loaded SSZ-13 zeolite (Cu-SSZ-13) can be manufactured through the step of supporting copper on the zeolite. Cu-SSZ-13 is known as a zeolite used for a reduction catalyst of nitrogen oxides, particularly a selective catalytic reduction (SCR) using ammonia as a reducing agent.

Because the zeolite of present inventive concept does not occur the structural change after hydrothermal treatment above 750° C., the copper-loaded SSZ-13 zeolites (Cu-SSZ-13) can be manufactured and used as an SCR catalyst at a temperature over 750° C.

Hereinafter, examples of the present inventive concept will be described in order to facilitate understanding of the present inventive concept. It should be noted, however, that the following experiments are intended to assist the understanding of the present inventive concept, and the scope of the present inventive concept is not limited by the following experimental examples.

Production Example 1: Synthesis of Zeolite by Using Benzyltrimethylammonium Hydroxide (SDA1)

After dissolving NaOH in distilled water, add USY zeolite ($SiO_2/Al_2O_3$ molar ratio=30) as alumina and silica source and mixed until a homogeneous solution is obtained. Benzyltrimethylammonium hydroxide (SDA1) is added to the mixed solution and stirred until a homogeneous solution is obtained. Thus, a hydrogel having the following molar composition is prepared.

$SiO_2$:NaOH:SDA1:$H_2O$=1:0.2:0.2:22.62

The hydrogel is hydrothermally synthesized at 140° C. for 4 days to 10 days under 20 rpm to 60 rpm rotation, and the product is recovered by filtration.

Production Example 2: Synthesis of Zeolite by Using Benzyltrimethylammonium Chloride (SDA2)

After dissolving NaOH in distilled water, add USY zeolite ($SiO_2/Al_2O_3$ molar ratio=30) as alumina and silica source and mixed until a homogeneous solution is obtained. Benzyltrimethylammonium chloride (SDA2) is added to the mixed solution and stirred until a homogeneous solution is obtained. Thus, a hydrogel having the following molar composition is prepared.

SiO$_2$:NaOH:SDA2:H$_2$O=1:0.4:0.4:22.62

The hydrogel is hydrothermally synthesized at 140° C. for 4 days to 10 days under 20 rpm to 60 rpm rotation, and the product is recovered by filtration.

Production Example 3: Synthesis of Zeolite by Using Benzyltriethylammonium Chloride (SDA3)

After dissolving NaOH in distilled water, add USY zeolite (SiO$_2$/Al$_2$O$_3$ molar ratio=30) as alumina and silica source and mixed until a homogeneous solution is obtained. Benzyltriethylammonium chloride (SDA3) is added to the mixed solution and stirred until a homogeneous solution is obtained. Thus, a hydrogel having the following molar composition is prepared.

SiO$_2$:NaOH:SDA3:H$_2$O=1:0.4:0.4:22.62

The hydrogel is hydrothermally synthesized at 140° C. for 4 days to 10 days under 20 rpm to 60 rpm rotation, and the product is recovered by filtration.

Production Example 4: Synthesis of Zeolite by Using Benzyltrimethylammonium Hydroxide (SDA1) and Benzyldimethylhexadecylammonium Chloride (SDA4)

After dissolving NaOH in distilled water, add USY zeolite (SiO$_2$/Al$_2$O$_3$ molar ratio=30) as alumina and silica source and mixed until a homogeneous solution is obtained. Benzyltrimethylammonium hydroxide (SDA1) and benzyldimethylhexadecylammonium chloride (SDA4) are added to the mixed solution and stirred until a homogeneous solution is obtained. Thus, a hydrogel having the following molar composition is prepared.

SiO$_2$:NaOH:SDA1:SDA4:H$_2$O=1:0.2:0.2:0.01:22.62

The hydrogel is hydrothermally synthesized at 140° C. for 4 days to 10 days under 20 rpm to 60 rpm rotation, and the product is recovered by filtration.

Production Example 5: Synthesis of Zeolite by Using Benzyltrimethylammonium Hydroxide (SDA1) and Na$_2$SO$_4$ After dissolving NaOH in distilled water, add USY zeolite (SiO$_2$/Al$_2$O$_3$ molar ratio=30) as alumina and silica source and mixed until a homogeneous solution is obtained. Benzyltrimethylammonium hydroxide (SDA1) and Na$_2$SO$_4$ are added to the mixed solution and stirred until a homogeneous solution is obtained. Thus, a hydrogel having the following molar composition is prepared.

SiO$_2$:NaOH:SDA1:H$_2$O:Na$_2$SO$_4$=1:0.2:0.2:22.62:0.1

The hydrogel is hydrothermally synthesized at 140° C. for 4 days to 10 days under 20 rpm to 60 rpm rotation, and the product is recovered by filtration.

Production Example 6: Synthesis of Zeolite by Using Zeolite USY with SiO$_2$/Al$_2$O$_3$ Molar Ratio of 500

After dissolving NaOH in distilled water, add USY zeolite (SiO$_2$/Al$_2$O$_3$ molar ratio=500) as alumina and silica source and mixed until a homogeneous solution is obtained. Benzyltrimethylammonium hydroxide (SDA1) is added to the mixed solution and stirred until a homogeneous solution is obtained. Thus, a hydrogel having the following molar composition is prepared.

SiO$_2$:NaOH:SDA1:H$_2$O=1:0.3:0.2:22.62

The hydrogel is hydrothermally synthesized at 140° C. for 4 days to 10 days under 20 rpm to 60 rpm rotation, and the product is recovered by filtration.

The composition of mixtures used in examples 1 to 6 is summarized in table 1 below.

TABLE 1

| example | hydrogel |
|---|---|
| 1 | SiO$_2$:0.2NaOH:0.2SDA1:22.62H$_2$O |
| 2 | SiO$_2$:0.4NaOH:0.4SDA2:22.62H$_2$O |
| 3 | SiO$_2$:0.4NaOH:0.4SDA3:22.62H$_2$O |
| 4 | SiO$_2$:0.2NaOH:(0.2SDA1 + 0.01SDA4):22.62H$_2$O |
| 5 | SiO$_2$:0.2NaOH:0.2SDA1:22.62H$_2$O:0.1Na$_2$SO$_4$ |
| 6 | SiO$_2$:0.3NaOH:0.2SDA1:22.62H$_2$O |

SDA1: Benzyltrimethylammonium hydroxide
SDA2: Benzyltrimethylammonium chloride
SDA3: Benzyltriethylammonium chloride
SDA4: Benzyldimethylhexadecylammonium chloride Comparative Example Commercial SSZ-13 type zeolite is prepared by hydrothermal synthesis of hydrogel containing N,N,N-trialkyladamantanammonium hydroxide.

Figure 2A:
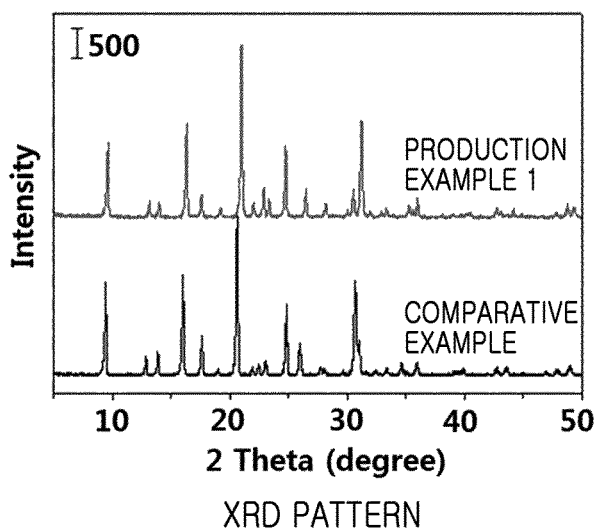
FIGS. 2A and 2B show XRD patterns and $^{29}Si$ NMR spectra of the zeolite prepared in Production Example 1 and the Comparative Example.
Figure 2B:
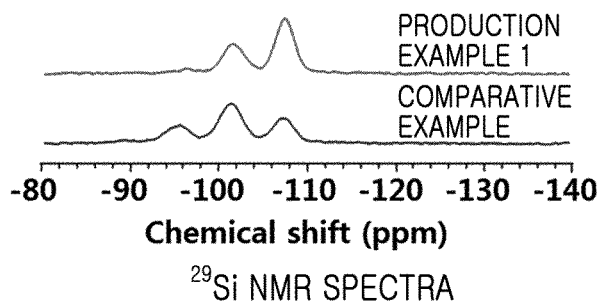

FIGS. 2A and 2B show XRD patterns and $^{29}$Si NMR spectra of the zeolite prepared in Production Example 1 and the Comparative Example.

Referring to FIGS. 2A and 2B, SSZ-13 (Standard Oil Synthetic Zeolite-13) type zeolite is produced when USY zeolite with SiO$_2$/Al$_2$O$_3$ molar ratio of 30 is used.

Also, referring to FIG. 2A, it can be seen that SSZ-13 type zeolite having excellent crystallinity is produced without using expensive SDA of adamantane series.

Referring to FIG. 2B, it can be seen that SSZ-13 type zeolite with a high Si/Al molar ratio is synthesized through the synthesis process of Production Example 1.

Therefore, it can be confirmed that the SSZ-13 type zeolite can be produced when a SiO$_2$/Al$_2$O$_3$ molar ratio of raw material is 5 to 600.

As described above, the use of SDA containing a benzyl group instead of the relatively expensive SDA of adamantane series reduces the cost of raw materials. Also, the process time is shortened, so that the cost required for the hydrothermal synthesis can be reduced.

Figure 3A:
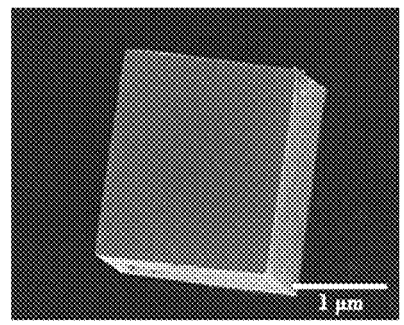
FIGS. 3A, 3B and 3C are SEM images of the zeolite produced in Production Example 1, Example 4 and Comparative Example.
Figure 3B:
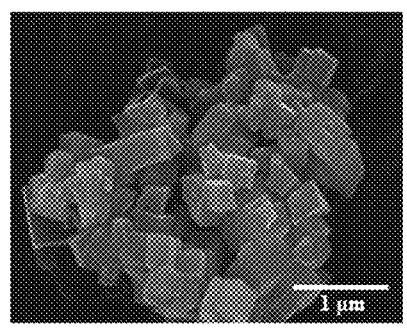
Figure 3C:
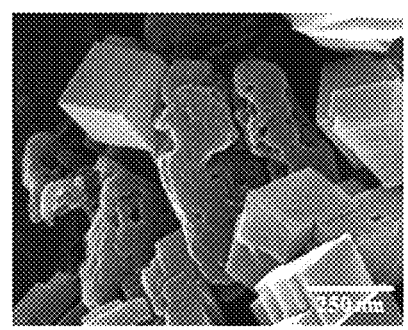

FIGS. 3A, 3B and 3C are SEM images of the zeolite produced in Production Example 1, Production Example 4 and Comparative Example.

Referring to FIG. 3A, it can be confirmed that the conventional SSZ-13 zeolite has an average particle size over 1 μm.

Referring to FIG. 3B, it can be confirmed that the zeolite produced according to Example 1 has a nano-sized particle diameter, and particularly has an average particle size of 0.2 μm to 0.5 μm. That is, according to Example 1, a zeolite having a small particle size is produced.

Referring to FIG. 3C, it can be seen that the zeolite prepared according to Production Example 4 has an average particle size of 0.2 μm to 1.0 μm. That is, by adding benzyldimethylhexadecylammonium with a long molecular length, zeolite having micropores and mesopores simultaneously can be obtained.

Accordingly, by further using the second SDA containing a benzyl group with an alkyl group of 8 to 20 carbon atoms, it is possible to produce a zeolite having micropores and mesopores at the same time. Thereby the diffusion of the reactant is facilitated and thus the zeolite of the present inventive concept can be applied to various catalytic reactions.

Figure 4A:
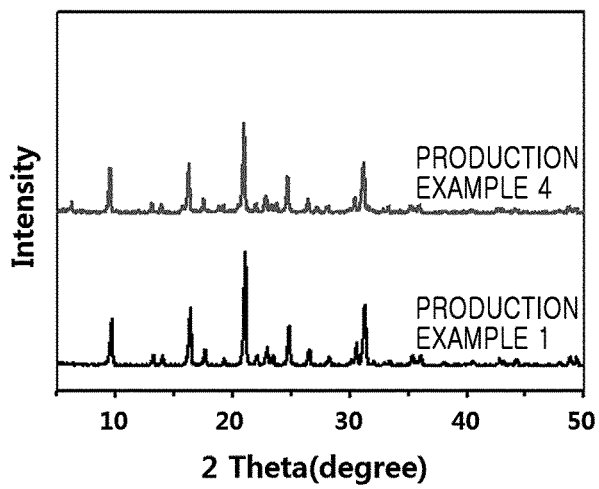
FIGS. 4A and 4B are XRD patterns of the zeolite obtained in Production Example 1, Production Example 2, Production Example 3, Production Example 4 and Production Example 5.
Figure 4B:
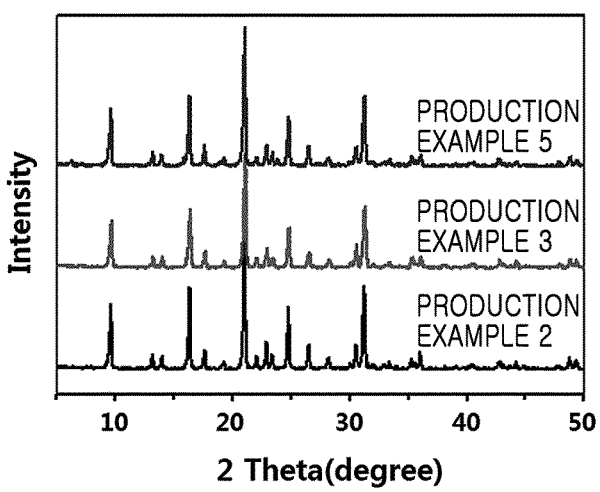

FIGS. 4A and 4B are XRD patterns of the zeolite obtained in Production Example 1, Production Example 2, Production Example 3, Production Example 4 and Production Example 5.

Referring to FIGS. 4A and 4B, it can be seen that the zeolites prepared in Production Example 1, Production Example 2, Production Example 3, Production Example 4 and Production Example 5 have all SSZ-13 structures.

Accordingly, in accordance with an embodiment of the present inventive concept, when the zeolite is synthesized by using at least one SDA selected from the group consisting of benzyltrimethylammonium hydroxide, benzyltriethylammonium hydroxide, benzyltripropylammonium hydroxide, benzyltributylammonium hydroxide, benzyltrimethylammonium halide, benzyltriethylammonium halide, benzyltripropylammonium, and benzyltributylammonium halide, it can be seen that zeolite having the same structure can be manufactured.

On the other hand, in Production Example 5, by adding $Na_2SO_4$ to the hydrogel, it can be seen that the zeolite produced only for 1 to 4 days has the same structure as the zeolite obtained for 4 to 10 days.

Therefore, when a compound containing a sulfate ion is further included, the hydrothermal reaction rate is increased, and the zeolite synthesis time is shortened, thereby shortening the process time.

Figure 5A:
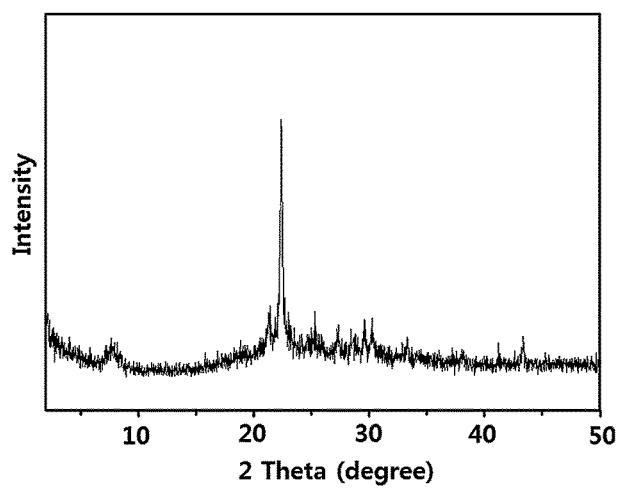
FIGS. 5A and 5B are an XRD pattern and an SEM image of the zeolite synthesized in Production Example 6.
Figure 5B:
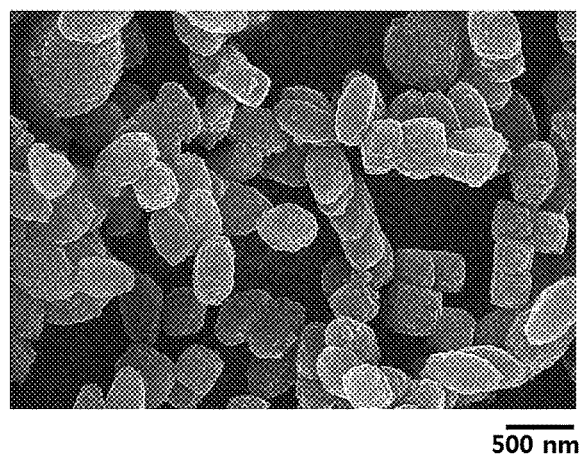

FIGS. 5A and 5B are an XRD pattern and an SEM image of the zeolite synthesized in Production Example 6.

Referring to FIGS. 5A and 5B, it can be seen that when USY zeolite with a $SiO_2/Al_2O_3$ molar ratio of 500 is used, the type of BEA (Zeolite Beta) is produced.

Therefore, various types of zeolite including SSZ-13 type zeolite can be produced when the $SiO_2/Al_2O_3$ molar ratio of the USY zeolite is a specific value. In one embodiment, a BEA type zeolite (Zeolite Beta) was obtained from a raw material with a $SiO_2/Al_2O_3$ molar ratio of 490 to 510.

Figure 6A:
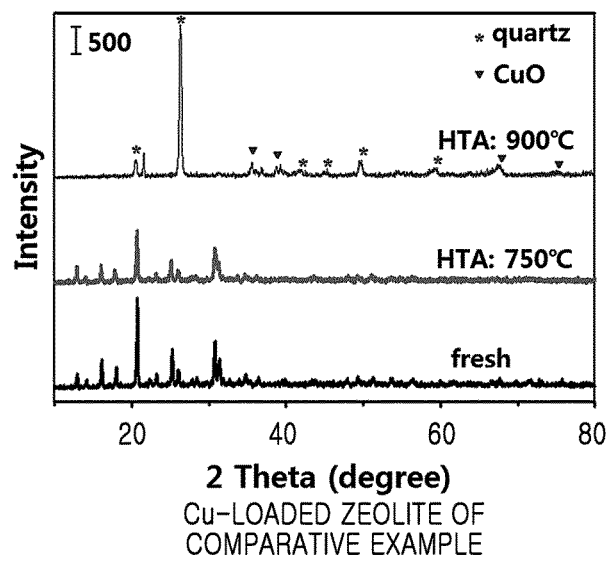
FIGS. 6A and 6B are XRD patterns of copper-loaded zeolite prepared by supporting copper on the zeolite of Comparative Example and Production Example 1, respectively.
Figure 6B:
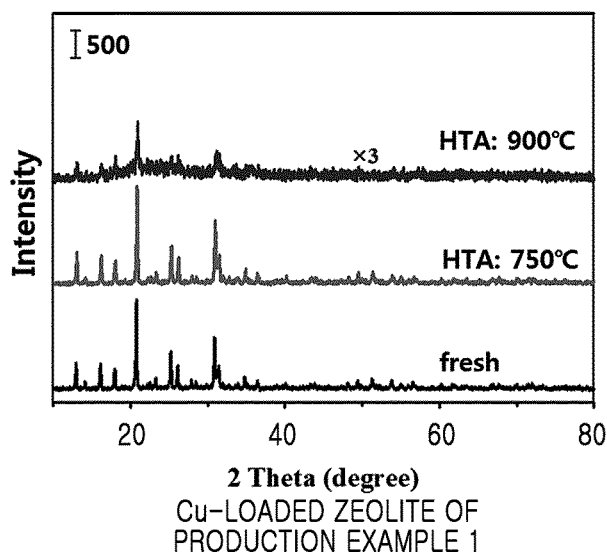

FIGS. 6A and 6B are XRD patterns of copper-loaded zeolite prepared by supporting copper on the zeolite of Comparative Example and Production Example 1, respectively.

Particularly, copper is loaded in the zeolite prepared in Production Example 1 and Comparative Example, and then subjected to hydrothermal aging (HTA) at 750° C. and 900° C., respectively. Then, the XRD patterns of the Cu-loaded zeolite without hydrothermal aging and after hydrothermal aging are compared together.

Referring to FIG. 6A, it can be seen that the zeolite peak disappears and the quartz peak appears in the copper-loaded zeolite of Comparative Example (conventional Cu-SSZ-13) after hydrothermal aging at 900° C.

Referring to FIG. 6B, it can be seen that the zeolite peak does not disappear even after the hydrothermal aging at 900° C. in the copper-loaded zeolite of Production Example 1 (Cu-SSZ-13 of the present inventive concept).

Therefore, the zeolite prepared according to the embodiments of the present inventive concept has a Si/Al molar ratio of 10 to 100, and excellent hydrothermal stability due to low aluminum content. Furthermore, it can be confirmed that the structural change of the zeolite does not occur even in the hydrothermal aging above 750° C. at which the structural destruction of the conventional zeolite starts. In addition, it can be confirmed that the characteristic peak of zeolite is retained even at 900° C., at which the structure of the conventional zeolite is completely destroyed.

Figure 7A:
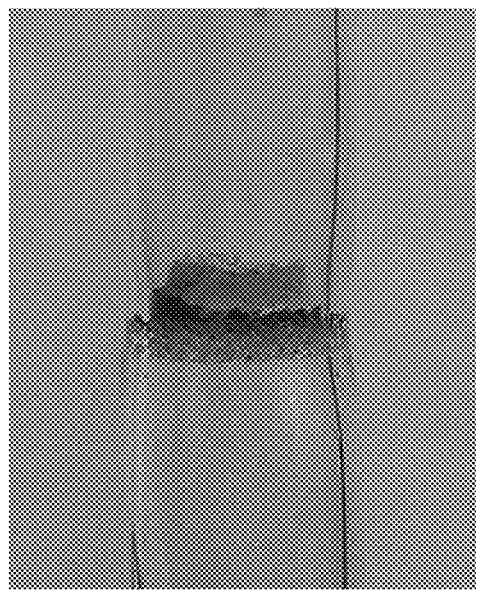
FIGS. 7A and 7B show images of the copper-loaded zeolite prepared by supporting copper on the zeolite of Comparative Example and Production Example 1, respectively, after hydrothermal aging.
Figure 7B:
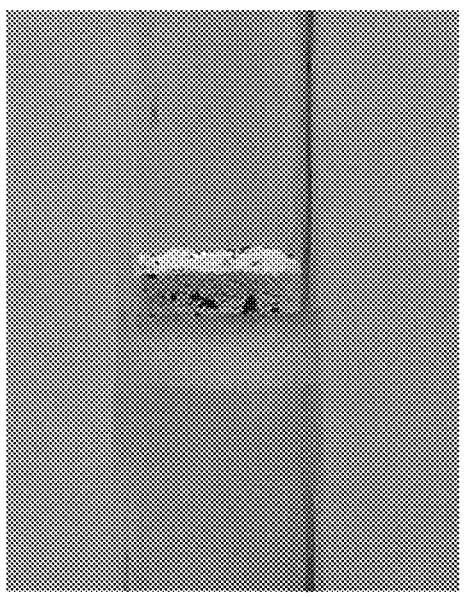

FIGS. 7A and 7B show images of the copper-loaded zeolite prepared by supporting copper on the zeolite of Comparative Example and Production Example 1, respectively, after hydrothermal aging.

Specifically, copper is loaded in the zeolite prepared in Production Example 1 and Comparative Example, and then hydrothermally treated at 900° C.

Referring to FIGS. 7A and 7B, when the copper-loaded zeolite of Comparative Example (conventional Cu-SSZ-13) hydrothermally treated at 900° C., the characteristics of the zeolite are lost to such an extent as to be visually distinguished. However, in the case of the copper-loaded zeolite of Production Example 1 (Cu-SSZ-13 of the present inventive concept), it can be seen that even after the hydrothermal aging at 900° C., the copper-loaded zeolite has a characteristic blue color.

Therefore, it can be seen that the characteristics of the zeolite are retained even after hydrothermal aging at 900° C. at which the structure of the conventional zeolite is completely destroyed.

Figure 8A:
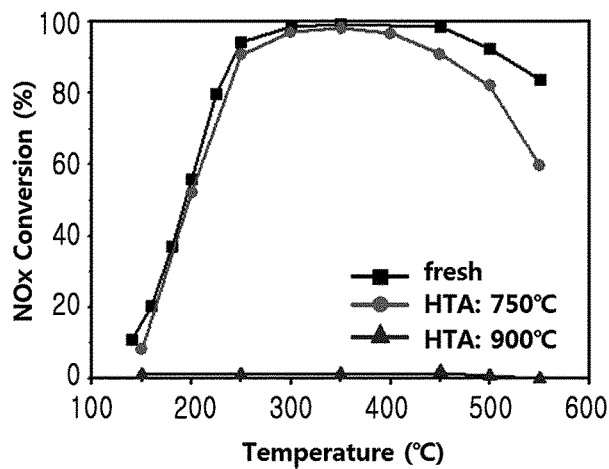
FIGS. 8A and 8B are graphs showing the SCR reaction activity of copper-loaded zeolites prepared by supporting copper on the zeolites of Comparative Example and Production Example 1, respectively.
Figure 8B:
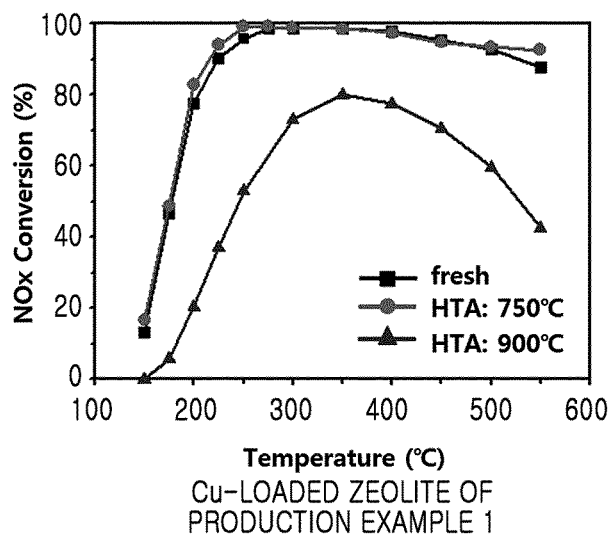

FIGS. 8A and 8B are graphs showing the SCR reaction activity of copper-loaded zeolite prepared by supporting copper on the zeolites of Comparative Example and Production Example 1, respectively.

Particularly, copper is loaded in the zeolite prepared in Production Example 1 and Comparative Example, and then subjected to hydrothermal aging (HTA) at 750° C. or 900° C. to compare with copper-loaded zeolite without hydrothermal aging (fresh).

Referring to FIG. 8A, in the case of the copper-loaded zeolite of Comparative Example (conventional Cu-SSZ-13), the hydrothermal aging (HTA) at 750° C. slightly lowers the activity of the SCR reaction, and the conventional Cu-SSZ-13 that is hydrothermally treated at 900° C. loses the activity of the SCR reaction.

On the other hand, referring to FIG. 8B, when hydrothermal aging (HTA) is carried out at 750° C. for the copper-loaded zeolite of Production Example 1 (Cu-SSZ-13 of the present inventive concept), there is no change in the SCR reaction activity and the activity of the SCR reaction is retained at a relatively high level even if the hydrothermal aging (HTA) is carried out at 900° C.

Therefore, since the zeolite of the present inventive concept does not undergo structural change in the hydrothermal aging over 750° C., the copper-loaded zeolite (Cu-SSZ-13 of the present inventive concept) can be used as an SCR catalyst at a temperature over 750° C. at which the conventional Cu-SSZ-13 is deformed.

Particularly, the zeolite of the copper-loaded SSZ-13 (Cu-SSZ-13) according to an embodiment of the present inventive concept can be confirmed that it can be used as an SCR catalyst from the temperature of 750° C. at which the conventional Cu-SSZ-13 starts to decrease SCR activity to the temperature of 900° C. at which the SCR activity is completely lost.

As described above, the present inventive concept relates to a process for producing a zeolite using a structure directing agent (SDA) comprising a low-cost benzyl group, thereby reducing raw material costs and reducing processing costs.

Furthermore, various types of zeolite can be prepared by controlling the $SiO_2/Al_2O_3$ molar ratio of the raw material as alumina and silica source, and additional effects due to the addition of the second SDA and the compound including sulfate ion can be obtained.

On the other hand, when the conventional zeolite is hydrothermally treated at a high temperature above 750° C., the crystal structure is collapsed and the characteristics of the zeolite are lost. In contrast, the zeolite prepared according to the present inventive concept has improved hydrothermal stability and catalytic activity. In order to confirm improvement, the physical properties of the zeolite are estimated after the hydrothermal aging is carried out at 900° C. in the air containing $H_2O$ of 10%. Especially, the specific surface area showing the micropore retention of zeolite and the selective catalytic reduction performance for removing NOx which is a harmful component of exhaust gas of automobile are investigated.

The invention claimed is:

1. A method of synthesizing a Standard Oil Synthetic Zeolite-13 (SSZ-13) or Zeolite Beta (BEA) type zeolite comprising:
   preparing a hydrogel comprising a first structure directing agent containing a benzyl group, a zeolite raw material, a basic material and distilled water; and
   hydrothermally synthesizing the hydrogel,
   wherein the zeolite raw material is zeolite USY comprising alumina and silica, and the first structure directing agent containing the benzyl group is selected from a group consisting of hydroxides, halides, carbonates and sulphates which have benzyltrimethylammonium ion, benzyltriethylammonium ion, benzyltripropylammonium ion or benzyltributylammonium ion as cations,
   wherein the synthesized zeolite has a structure which is retained even after hydrothermal aging in a temperature range of 750° C. to 950° C.

2. The method of claim 1, wherein the hydrogel further comprises a second structure directing agent,
   wherein the second structure directing agent comprises at least one selected from the group consisting of hydroxides, halides, carbonates and sulphates containing a cation having the following formula,

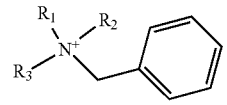

wherein $R_1$ is one selected from the group consisting of alkyl of $C_1$ to $C_4$, $R_2$ is one selected from the group consisting of alkyl of $C_1$ to $C_4$, and $R_3$ is one selected from the group consisting of alkyl of $C_8$ to $C_{20}$.

3. The method of claim 2, wherein the synthesized zeolite has an average particle diameter of 0.2 μm to 1.0 μm, and simultaneously has both micropores and mesopores.

4. The method of claim 1, wherein the synthesized zeolite is BEA type zeolite if the zeolite raw material has a $SiO_2/Al_2O_3$ molar ratio of 490 to 510.

5. The method of claim 1, wherein the hydrogel further comprises a sulfate ion.

* * * * *